United States Patent

Tsukamoto

[11] Patent Number: 5,692,094
[45] Date of Patent: Nov. 25, 1997

[54] FILM IMAGE SCANNING APPARATUS FOR PICKING UP AN IMAGE AND MAGNETIC DATA RECORDED ON A FILM WITHOUT DETERIORATION FROM NOISE GENERATED BY A PERIPHERAL CIRCUIT

[75] Inventor: Kazuya Tsukamoto, Sagamihara, Japan

[73] Assignee: Olympus Optical Co., LTD., Tokyo, Japan

[21] Appl. No.: 647,873

[22] Filed: May 3, 1996

[30] Foreign Application Priority Data

May 17, 1995 [JP] Japan ................... 7-118491

[51] Int. Cl.⁶ ............................. H04N 5/76; G11B 5/633
[52] U.S. Cl. ......................... 386/46; 386/127; 360/3; 396/129; 348/96
[58] Field of Search ................... 358/332, 345, 358/347; 348/96, 97, 98, 370, 371, 372, 730; 360/3; 354/484; 355/30, 50; 386/42–43, 6, 7, 8, 68, 127, 128, 129, 130, 46; 396/129

[56] References Cited

U.S. PATENT DOCUMENTS

| | | | |
|---|---|---|---|
| 3,846,591 | 11/1974 | Case | 179/100.1 |
| 5,124,743 | 6/1992 | Shiota | 355/30 |
| 5,274,422 | 12/1993 | Yoshikawa | 355/77 |
| 5,347,403 | 9/1994 | Uekusa | 360/3 |
| 5,486,895 | 1/1996 | Leidig et al. | 355/50 |

FOREIGN PATENT DOCUMENTS 5-75922  3/1993  Japan .

OTHER PUBLICATIONS

Taniguchi et al., "Waterproof Camera", Japanese Abstract of JP 62–178226, Aug. 5, 1987.
Endo, "Projector Device", Japanese Abstract of JP 6–118372, Apr. 28, 1994.

Primary Examiner—Thai Tran
Assistant Examiner—Aung S. Moe
Attorney, Agent, or Firm—Frishauf, Holtz, Goodman, Langer & Chick

[57] ABSTRACT

A light source illuminates a developed silver salt photographing film having a magnetic recording portion on which magnetic data is recorded. A light source drive section drives the light source. An image read section reads image data from the film illuminated by the light source. A reproduction section reproduces magnetic data recorded on the magnetic recording portion of the film. A power feeding control section prohibits a power feeding to the light source drive section or reduces an amount of power feeding when the magnetic data is reproduced by the reproduction section.

25 Claims, 7 Drawing Sheets

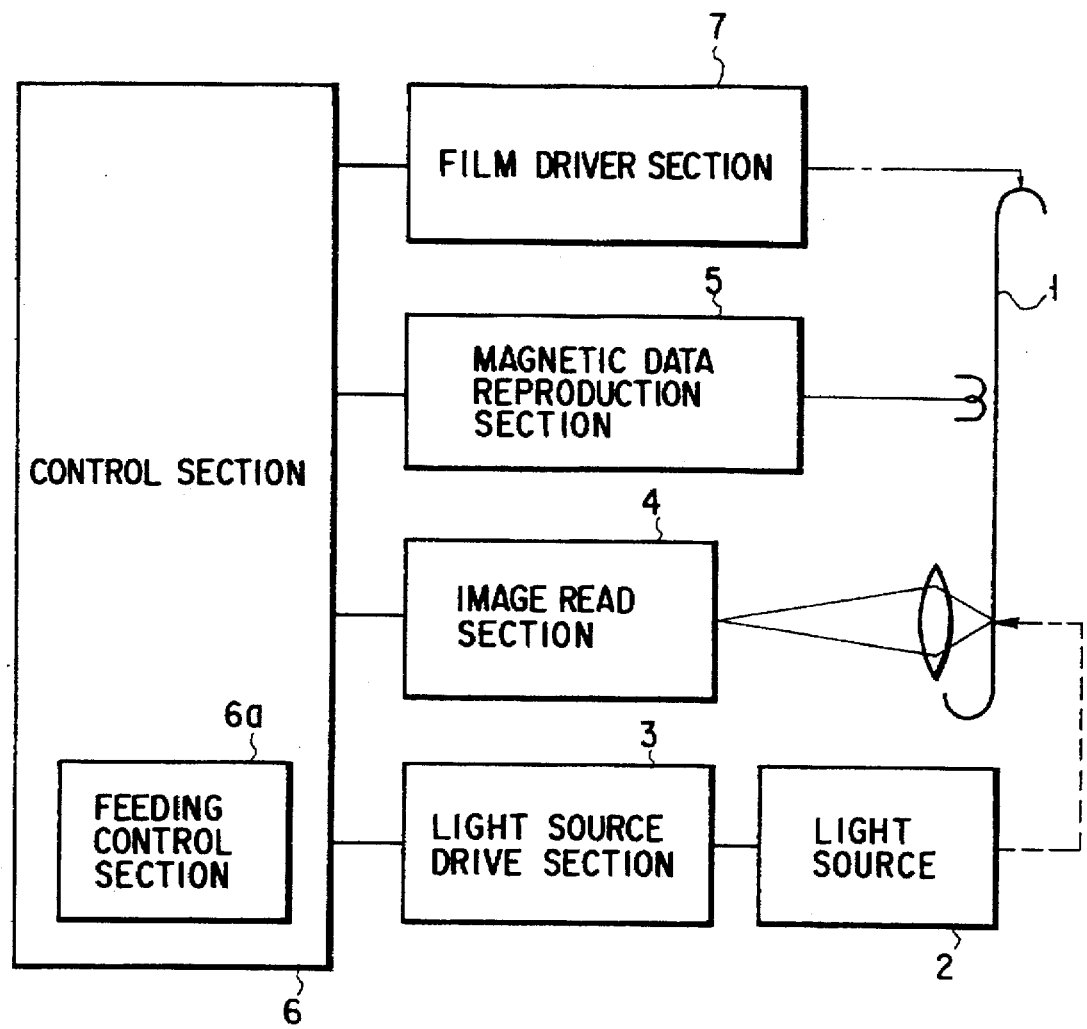
F I G. 1A

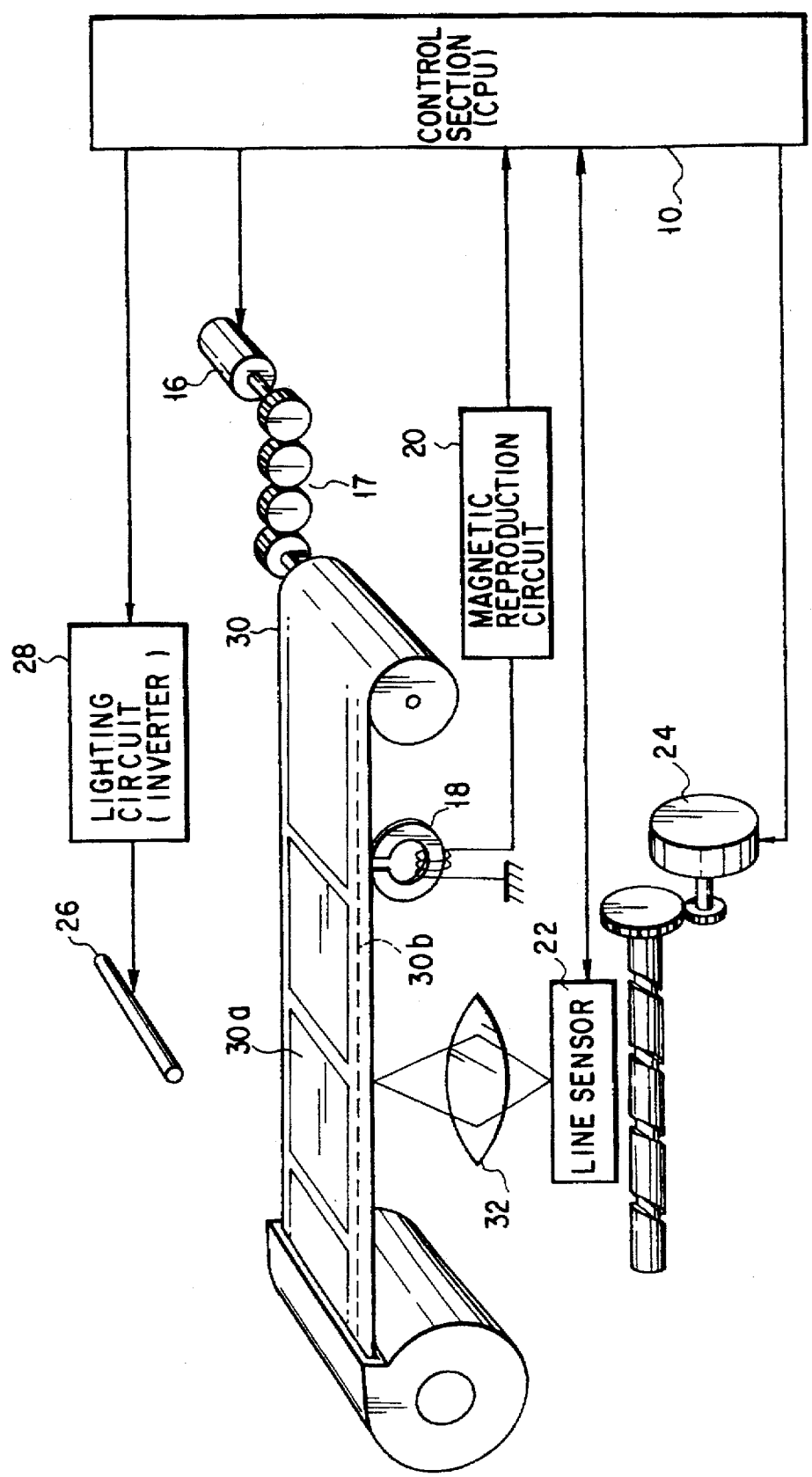
F I G. 2

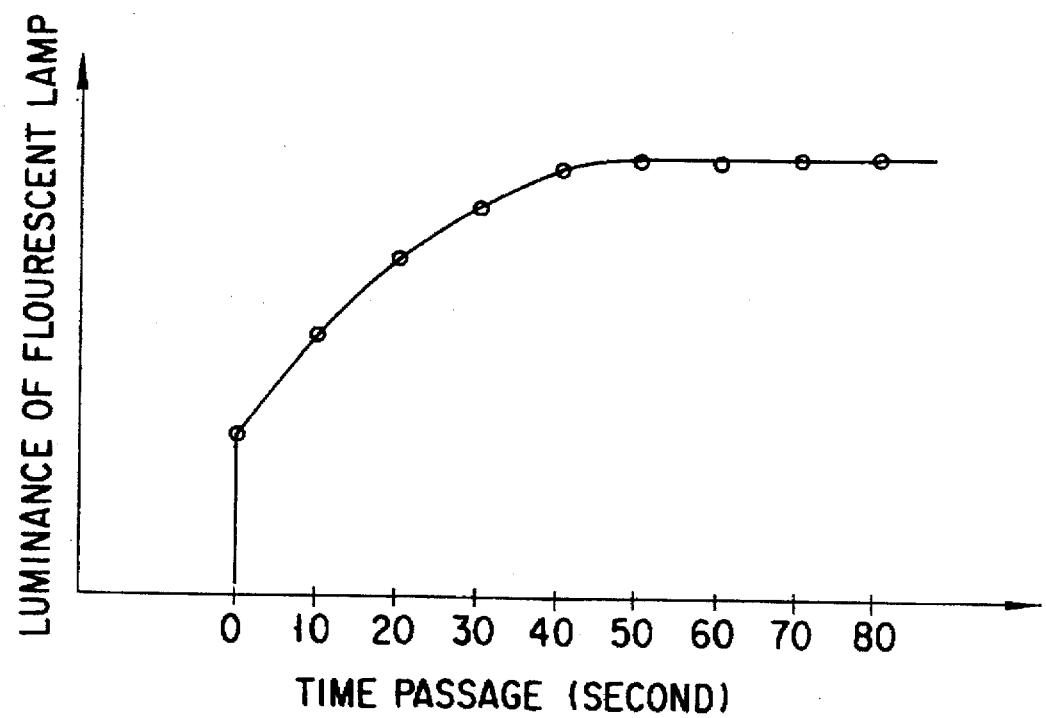
F I G. 5A
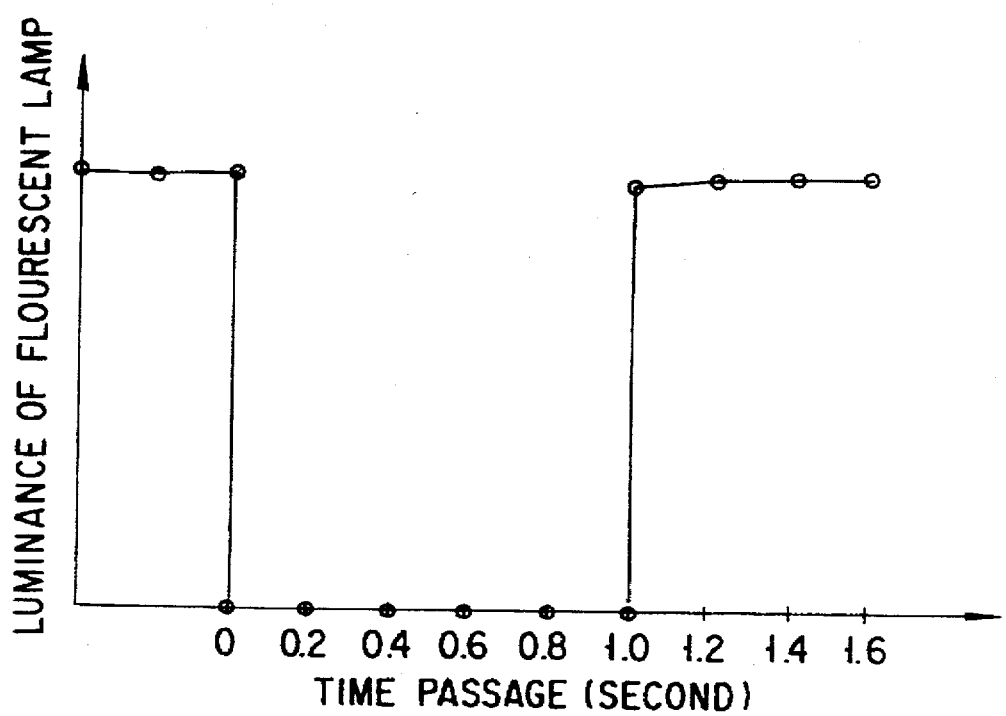
F I G. 5B

FILM IMAGE SCANNING APPARATUS FOR PICKING UP AN IMAGE AND MAGNETIC DATA RECORDED ON A FILM WITHOUT DETERIORATION FROM NOISE GENERATED BY A PERIPHERAL CIRCUIT

BACKGROUND OF THE INVENTION

1. Field of the Invention

The present invention relates to a film image scanning apparatus and, more particularly, to a film image scanning apparatus for picking up an image on a developed silver salt photographing film in which magnetic data is recorded, and for reproducing (reading) magnetic data recorded in the film at the time of photographing.

2. Description of the Related Art

Various proposals have been made with respect to a conventional film image scanning apparatus in which an image on a developed silver salt photographing film is picked up to be converted to an image signal, and the image signal is output to a monitor to be displayed.

For example, Japanese Patent Application KOKAI Publication No. 5-75922 discloses the following film image scanning apparatus.

More specifically, in the case of using a silver salt photographing film having a magnetic recording portion, which is magnetically recordable, magnetic data can be rapidly recorded and reproduced at the time of frame-feeding of the film without repeating forward feeding of the film, and reverse feeding in writing and reading magnetic data to/from the magnetic recording layer of the film. Also, a magnetic recording/reproducing can be executed at a fixed film feeding speed with a simple structure.

In the above-mentioned film image scanning apparatus, the apparatus is structured such that magnetic data can be read from the magnetic recording portion of the film at the time of the frame feeding of the film, that is, the time of winding up the film. At this time, a peripheral circuit of the magnetic reproducing section, that is, a noise source, is in an activation state.

However, in the above-mentioned Japanese Patent Application KOKAI Publication No. 5-75922, there is no consideration of noise emitted from the peripheral circuit when magnetic data of the conventional film image scanning apparatus is reproduced. Due to this, there is a problem in that magnetic data cannot be satisfactorily reproduced from the magnetic recording layer of the film.

For example, in a case where a fluorescent lamp is used as a light source for illuminating the film, and an inverter circuit is used as a circuit for driving the fluorescent lamp, an S/N ratio of reproduced magnetic data is deteriorated by noise generated from the inverter circuit when magnetic data is reproduced from the magnetic recording layer of the film. Due to this, a reproduction error is easily generated.

In other words, in this case, since the inverter circuit has an oscillation source, the oscillation source easily becomes a noise source.

SUMMARY OF THE INVENTION

It is, therefore, an object of the present invention to provide a new and improved film image scanning apparatus in which an S/N ratio of reproduced magnetic data can be prevented from being deteriorated by noise generated from a peripheral circuit when magnetic data is reproduced from a magnetic recording layer of a developed silver salt photographing film having magnetic data recorded thereon.

Accordingly, a reproduction error can be prevented and magnetic data can be correctly read in the case of using the silver salt photographing film having the magnetically recordable magnetic recording layer.

In order to achieve the above object, there is provided a film image scanning apparatus comprising a light source for illuminating a developed film; light source drive means for driving the light source; image read means for reading magnetic data from the film illuminated by the light source; reproduction means for reproducing magnetic data recorded on the film; and power feeding control means for prohibiting a power feeding to the light source drive means or reducing an amount of power feeding when the magnetic data is reproduced by the reproduction means.

Moreover, according to the film image scanning apparatus of the present invention, the light source drive means includes an inverter circuit.

Furthermore, according to the present invention, there is provided a film image scanning apparatus comprising a light source for illuminating a developed film; light source drive means for driving the light source; image read means for reading magnetic data from the film illuminated by the light source; reproduction means for reproducing magnetic data recorded in the film; and power feeding control means for prohibiting a power feeding to the noise generation source or reducing an amount of power feeding when the magnetic data is reproduced by the reproduction means.

According to the film image scanning apparatus of the present invention, the developed film is illuminated by the light source and the light source is driven by the image drive means, and image data is read from the film illuminated by the light source by image read means. Then, magnetic data recorded on the film is reproduced by reproduction means. The power feeding control means prohibits the power feeding to the light source drive means or reduces the amount of power feeding in reproducing magnetic data by reproduction means.

In other words, at the time of reproducing magnetic data, a power source of the circuit, which becomes an unnecessary noise source in reproducing, is turned off, or the operation is prohibited, thereby the generation of noise can be restrained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1A and 1B are block diagrams each showing a conceptual structure of a film image scanning apparatus of the present invention;

FIG. 2 is a view showing the structure of a film image scanning apparatus of a first embodiment of the present invention;

FIGS. 5A and 5B are views showing a characteristic of luminance when a fluorescent lamp 26 of FIG. 2 is turned on.

DETAILED DESCRIPTION OF THE PREFERRED EMBODIMENTS

Figure 1B:
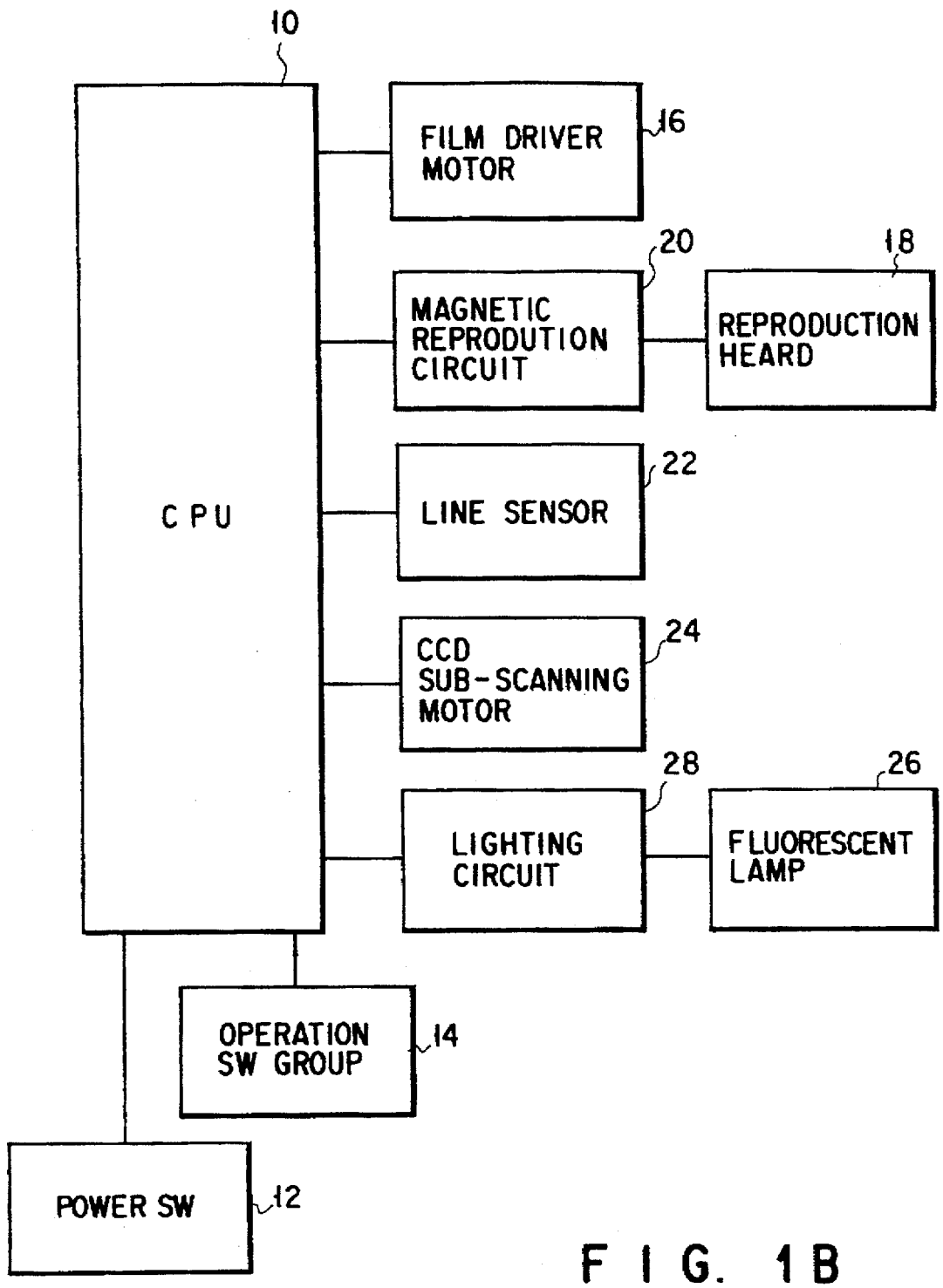

Reference will now be made in detail to the presently preferred embodiments of the present invention as illustrated in the accompanying drawings, in which reference characters designate like or corresponding parts throughout the several drawings.

Embodiments of the present invention will be explained with reference to the drawings.

FIG. 1A is a block diagram showing a conceptual structure of a film image scanning apparatus of the present invention.

As shown in FIG. 1A, the film image scanning apparatus of the present invention comprises a light source 2, a light source driving section 3, an image reading section 4, a magnetic data reproducing section 5, and a control section 6.

The light source 2 illuminates a developed silver salt photographing film 1, which is frame-fed by a frame driving section 7. The light source driving section 3 drives the light source 2. The image reading section 4 reads image data from the film 1 illuminated by the light source 2. The magnetic data reproducing section 5 reproduces magnetic data recorded onto the film 1. The control section 6 has a feed control section 6a for prohibiting the feeding to the power source driving section 3 or reducing an amount of feeding at the time of reproducing magnetic data due to the magnetic data reproducing section 5.

The control section 6 executes a predetermined control, which includes receiving and transmitting of a predetermined signal from/to the light source driving section 3, the image reading section 4, and the magnetic data reproducing section 5.

Moreover, as shown in FIG. 1B, which more specifies FIG. 1A, a power switch (power SW) 12, an operation switch (operation SW) group 14, a film drive motor 16, a magnetic reproducing circuit 20, a line sensor 22, a CCD sub-scanning motor 24, and a lighting circuit 28 are connected to a CPU (Central Processing Unit) 10 for controlling the whole film image scanning apparatus.

The power switch 12 is used to turn on/off the power source. The operation switch group 14 designates a frame-feeding of a developed silver salt photographing film having magnetic data recorded (to be described later). The film driving motor 16 winds and rewinds a film 30 (to be described later) by a gear mechanism 17. The magnetic reproducing circuit 20 amplifies/shapes an electrical signal of magnetic data read from the film by a reproduction head 18 at the time of the film feeding. The line sensor 22 comprises a CCD (Charge Coupled Device). The CCD sub-scanning motor 24, which comprises a stepping motor, is used to scan the line sensor 22 in a direction perpendicular to a line direction. The lighting circuit 28 is used to turn on a fluorescent lamp 26.

In this case, as the lighting circuit 28, an inverter circuit having a high oscillation frequency is used to increase a flashing frequency of the fluorescent lamp 26. In other words, the inverter circuit is used such that no trouble occurs in the input of the image even if the scanning speed of the line sensor 22 is increased.

In the explanation of the embodiment, a term of "main scanning" means that the line sensor 22 is scanned in the line direction. A term of "sub-scanning" means that the line sensor 22 is scanned by the CCD sub-scanning motor 24 as being moved to a direction perpendicular to the line direction.

FIG. 2 is a view showing the structure of a film image scanning apparatus of a first embodiment of the present invention.

In the film image scanning apparatus of the first embodiment of FIG. 2, the film driving motor 16 is driven to be rotated, so that a developed silver salt photographing film (hereinafter simply called film) 30, which has a photographed image section 30a and a magnetic recording portion 30b, and magnetic data recorded on the magnetic recording portion 30b, is wound one frame by one frame in the photographed image section 30a.

In the magnetic recording portion 30b of the film 30, magnetic data is written in advance by a camera.

At the time of the film feeding, magnetic data, which is written in the magnetic recording portion 30b corresponding to one frame of the film 30 in advance, is reproduced by the reproduction head 18.

Then, magnetic data is converted to an electrical signal by the reproduction head 18, and the electrical signal is amplified by the magnetic reproduction circuit 20, thereafter the amplified electrical signal is wave-shaped.

The wave-shaped electrical signal, that is, magnetic data, input to the CPU 10, and a predetermined processing is provided thereto.

After magnetic data is reproduced, an image is started to be input to the photographed image section 30a of the frame corresponding to magnetic data.

In the above image input, the CPU 10 is turned on the fluorescent lamp 26, serving as a light source, by the lighting circuit 28. The CPU 10 also outputs a drive pulse to the line sensor 22 to be scanned in the line direction. Thereby, an image corresponding to one line is input.

At this time, a film image, which is formed onto the photographed image section 30a of the film 30 when light projected from the fluorescent lamp 26 is transmitted through the film 30, is image-formed on the line sensor 22 by an image-form lens 32, thereby the film image is fetched to the CPU 10.

After finishing the image input for one line, the CPU 10 drives the CCD sub-scanning motor 24, which comprises the stepping motor, thereby the line sensor 22 is moved in a direction perpendicular to the line direction by an amount of one line. Thereafter, the line sensor 22 is main-scanned in the line direction again, thereby the image input corresponding to one line is executed.

At this time, in actual, the CPU 10 continuously executes the above operation without stopping the CCD sub-scanning motor 24.

The CPU 10 executes the above operation repeatedly so as to fetch image data corresponding to one screen of the film image, which is formed onto the photographed image section 30a of the film 30. Thereafter, a predetermined processing is executed.

In this case, the fluorescent lamp 26 or the line sensor 22, and the peripheral circuit become a noise source in reproducing magnetic data corresponding to one frame which is written onto the magnetic recording layer 30b of the film 30 in advance. Due to this, correct reproduction of magnetic data is prevented.

In order to solve the above problem, the CPU 10 turns off the lighting circuit 28, the fluorescent lamp 26, the line sensor 22, and the CCD sub-scanning motor 24 in reproducing magnetic data which is written onto the magnetic recording layer 30b of one frame of the film 30 in advance.

In this case, in order to turn off the fluorescent lamp 26, the oscillation of the lighting circuit 28 may be stopped in place of stopping the feeding to the lighting circuit 28 by the control of the CPU 10. Or, an amount of power feeding to the lighting circuit 28 may be reduced.

The stop of driving the line sensor 22 is executed by prohibiting the output of the drive pulse to the line sensor 22 from the CPU 10.

Figure 3:
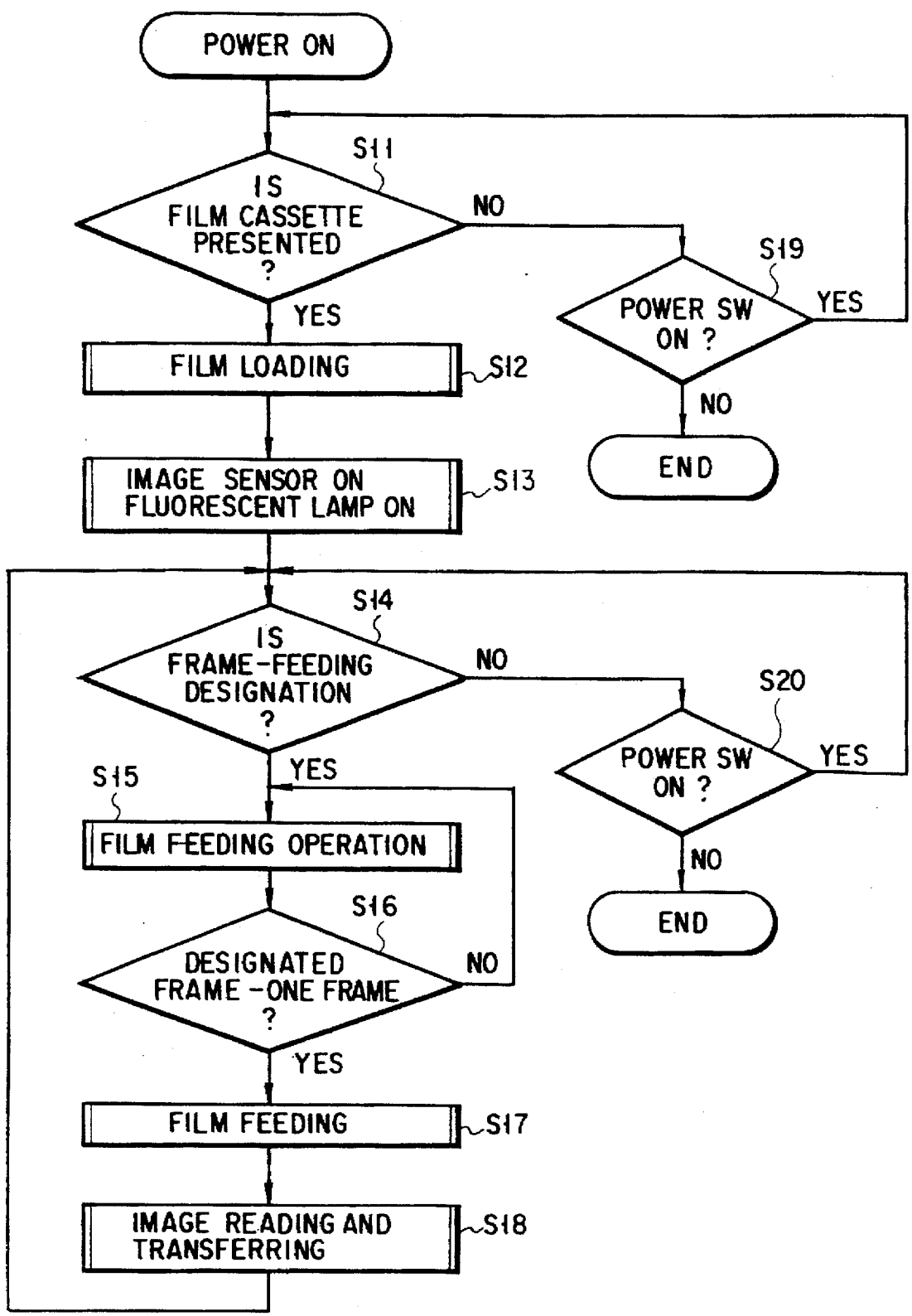
FIG. 3 is a flow chart showing steps of processing of a CPU 10 to explain an operation of the film image scanning apparatus of a first embodiment of the present invention.

The following will explain an operation of the film image scanning apparatus of the first embodiment in accordance with processing steps of the CPU 10 with reference to a flow chart of FIG. 3.

The power switch 12 (FIG. 1B) is turned on, and the operation of the CUP 10 is started.

The CPU 10 discriminates whether or not a film cassette is inserted to the film image scanning apparatus by film cassette detecting means (not shown) (step S11). The film cassette contains the developed silver salt photographing film 30, which has the photographed image section 30a and the magnetic recording layer 30b, and magnetic data recorded on the magnetic recording portion 30b.

If the film cassette is inserted, the CPU 10 executes a sub-routine "film loading" for loading the film 30 up to the first frame (step S12).

Sequentially, the CPU 10 outputs the drive pulse to the line sensor 22 such that the line sensor 22, serving as an image sensor, is turned on and the fluorescent lamp 26 is turned on (step S13).

Next, the CPU 10 discriminates whether or not there is a designation of a film frame feeding of the operation switch group 14 (step S14).

If there is the designation of the film frame feeding, the CPU 10 executes a sub-routine "film feeding operation" for frame-feeding the film 30 (step S15).

The CPU 10 discriminates whether or not the film 30 is frame-fed up to one frame before the frame designated by the step S14 by film frame detecting means (not shown) (step S16).

If the film 30 is not frame-fed up to one frame before the designated frame, the CPU 10 returns to the step S15, and executes the "film feeding operation" again.

Then, if the execution of the "film feeding operation" of step S15 and the discrimination of step 16 are repeatedly performed, thereby the film 30 is frame-fed up to one frame before the designated frame, the CPU 10 executes a sub-routine "film feeding" for reproducing magnetic data recording in the magnetic recording layer 30b of the film 30 (step S17).

Next, the CPU 10 executes a sub-routine "image reading/transfer" for inputting an image of the corresponding frame (step S18).

Thereafter, the CPU 10 returns to the step S14, and waits for a frame-feeding designation.

Also, the CPU 10 discriminates the state of the power switch 12 if the film cassette is not inserted to the film image scanning apparatus in step S11 (step 19).

In other words, if the power switch 12 is turned on in step S19, the CPU 10 returns to the step S11, and executes the processing of step 11 and the following steps. If the power switch 12 is turned off, the CPU 10 turns off all power sources, and ends the operation.

Also, even if there is no designation of the film frame feeding of the operation switch group 14 in step S14, the CPU 10 discriminates the state of the power switch 12 (step S20).

In other words, if the power switch 12 is turned on in step S20, the CPU 10 returns to the step S14, and executes the processing of step 14 and the following steps. If the power switch 12 is turned off, the CPU 10 turns off all power sources, and ends the operation. Thereby, the operation of the film image scanning apparatus is ended.

There is needed predetermined time till luminance of the fluorescent lamp 26 is in a stationary state after the lighting circuit 28 is turned on and the lighting of the fluorescent lamp 26 is started (to be described later).

Due to this, for example, the processing of step S13 may be executed before the processing of step S13. In this way, in consideration of predetermined time, which is needed such that luminance of the fluorescent lamp 26 is in a stationary state, the processing step of the CPU 10 may be changed.

Figure 4A:
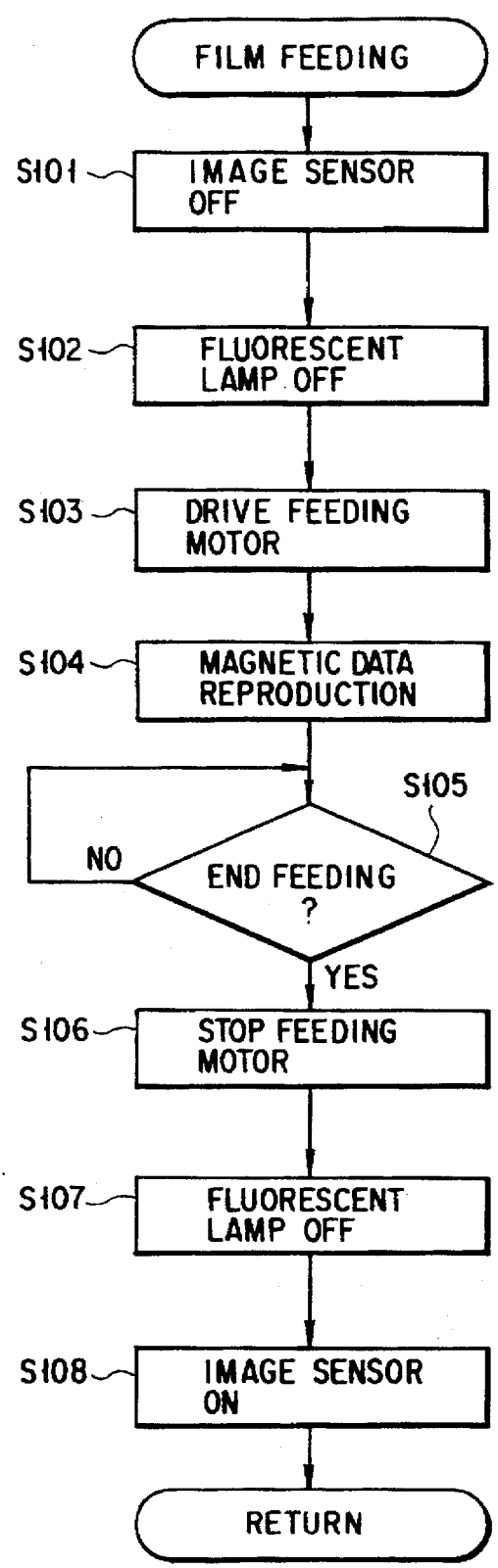
FIGS. 4A and 4B are flow charts each showing steps of processing of the CPU 10 to explain an operation of a sub-routine "film feeding" of FIG. 3.
Figure 4B:
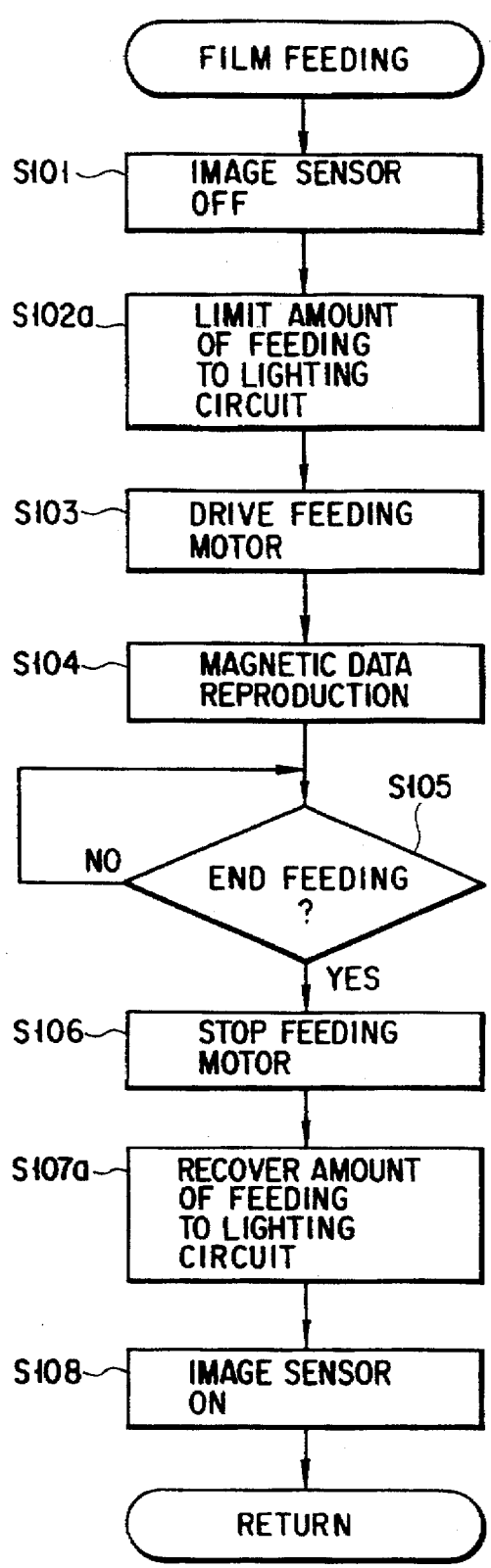

The following will explain an operation of sub-routine "film feeding" in accordance with the processing step of the CPU 10 with reference to the flow chart of FIGS. 4A and 4B.

First, when the operation of the film feeding is started, the CPU 10 prohibits the output of the drive pulse to the line sensor 22, so that the line sensor 22, serving as an image sensor, is turned off (step S101).

Moreover, the CPU 10 turns off the lighting circuit 28, so that the fluorescent lamp 26 is in an off state (step S102).

Thereby, the operation of a noise generation source is stopped.

The CPU 10 drives the film drive motor 16 to feed the film 30 (step S103), and executes the reproduction of magnetic data recorded in the magnetic recording layer 30b of the film 30 by the reproduction head 18 and the magnetic reproduction circuit 20 (step S104).

Sequentially, the CPU 10 discriminates whether or not the feeding corresponding to one frame of the film 30 is ended (step S105).

If the feeding corresponding to one frame of the film 30 is not ended, the CPU 10 executes the feeding of the film 30 until the feeding corresponding to one frame of the film 30 is ended. Then, if the feeding is ended, the CPU 10 stops the film drive motor 16 (step S106).

Then, the CPU 10 turns on the lighting circuit 28, so that the fluorescent lamp 26 is in an on state (step S107). Also, the CPU 10 turns on the line sensor 22, serving as an image sensor (step S108).

As mentioned above, the reproduction of magnetic data at the time of feeding the film is ended.

Next, the following will explain the relationship between the luminance characteristic and the film image input operation at the time of turning on the fluorescent lamp 26.

FIGS. 5A and 5B are views showing a luminance characteristic at the time of turning on the fluorescent lamp 26. Particularly, FIG. 5A is an initial luminance characteristic when the fluorescent lamp 26 is turned on, that is, luminance rise characteristic.

FIG. 5B shows a luminance characteristic, which can be obtained when the fluorescent lamp 26 is immediately turned on after the fluorescent lamp 26 is turned off in a state the luminance is stationary at the time of turning on the fluorescent lamp 26.

As is obvious from FIG. 5A, there is needed about 50 seconds till the luminance is in a stationary state after the current flows into the fluorescent lamp 26.

FIG. 5B is a luminance rise characteristic, which can be obtained when the fluorescent lamp 26, which is turned on in a stationary state, is turned off for one second and turned on again. There is needed about 0.2 seconds till the luminance is in a stationary state after the current flows into the fluorescent lamp 26 again.

In consideration of the above point, if the fluorescent lamp 26 is controlled to be turned off for one second only when the fluorescent lamp 26 is needed, the film image must be fetched when one minute is passed after the fluorescent lamp 26 is turned on, in order to obtain a stable image.

In consideration of time lag of one minute, the fluorescent lamp 26 must be always turned on.

However, in a state that the fluorescent lamp 26 is always turned on and the luminance is stationary, even if the fluorescent lamp 26 is turned off about one minute to feed the film 30 and reproduce magnetic data, the luminance of the fluorescent lamp 26 is returned to the stationary state about 0.2 seconds later when the fluorescent lamp 26 is turned on again after the reproduction of magnetic data is ended.

Therefore, even if the fluorescent lamp 26 is temporarily turned off during the feeding of the film 30, the luminance of the fluorescent lamp 26 is stabilized immediately after the film image is input since lag time is short till the luminance of the fluorescent lamp 26 is returned to the stationary state. Therefore, no trouble occurs in fetching the image.

Time of turning off the fluorescent lamp 26 to reproduce magnetic data may be set to be a range in which no trouble occurs in practical use in consideration of time, which is needed to reproduce magnetic data, and time, which is needed to the luminance of the fluorescent lamp 26 is returned to the stationary state.

The following will explain a film image scanning apparatus of a second embodiment of the present invention.

Figure 6:
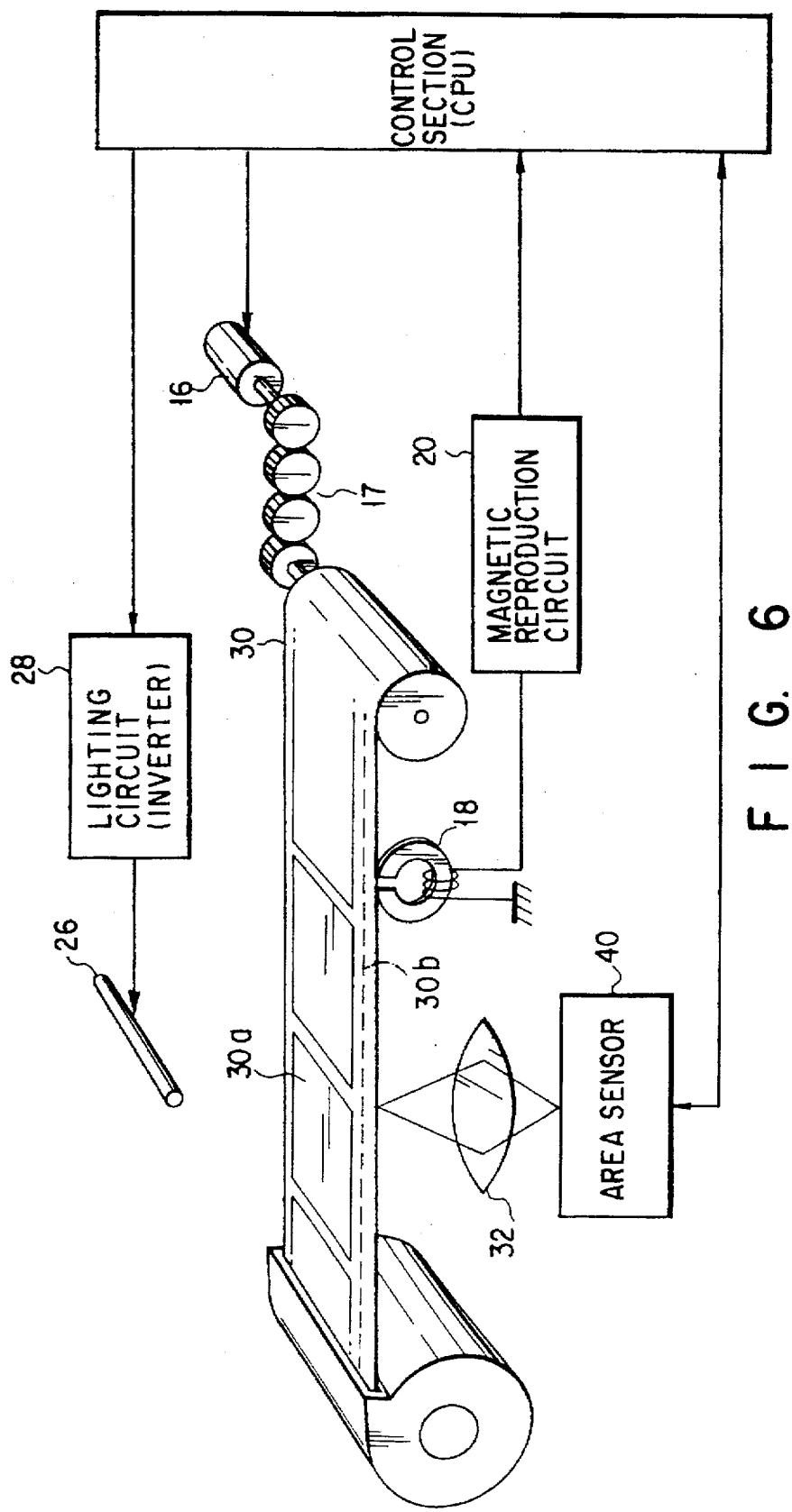
FIG. 6 is a view showing the structure of a film image scanning apparatus of a second embodiment of the present invention.

FIG. 6 is a view showing the structure of the film image scanning apparatus of the second embodiment of the present invention.

In the structure of the film image scanning apparatus of the second embodiment, the line sensor 22 of the first embodiment is replaced with an area sensor 40 comprising a CCD, and the CDD sub-scanning motor 24 of the first embodiment is emitted in accordance with such a replacement. The other structure is the same as the structure of the first embodiment.

In the film image scanning apparatus of the second embodiment, the film drive motor 16 is rotatably driven to wind the film 30.

In the magnetic recording layer 30 of the film 30, magnetic data is written in advance by a camera.

At the time of the film feeding, magnetic data, corresponds to one frame of the film 30, is reproduced by the reproduction head 18 to be converted to an electrical signal.

The magnetic reproduction circuit 20 amplifies the electrical signal, and wave-shapes the amplified electrical signal. Then, the wave-shaped electrical signal, that is, magnetic data, input to the CPU 10.

After magnetic data is reproduced as mentioned above, an image input of a frame, which corresponds to magnetic data, is started.

In the above image input, the fluorescent lamp 26 is turned on by the lighting circuit 28, serving as a light source, and the image input corresponding to one frame is executed in the lump by the area sensor 40.

At this time, a film image, which is formed onto the the film 30 when light projected from the fluorescent lamp 26 is transmitted through the film 30, is image-formed on the area sensor 40 by the image-form lens 32, thereby the film image is fetched to the CPU 10.

By the above-mentioned operation, the image corresponding to one frame, that is, image data of one screen, is input to the CPU 10.

In this case, when magnetic data is reproduced, the fluorescent lamp 26, the area sensor 40, and the peripheral circuits become noise sources, and magnetic data is prohibited from being correctly reproduced.

Due to this, the CPU 10 turns off the lighting circuit 28, and the area sensor 40 when the film 30 is fed to reproduce magnetic data.

As a method for turning off the fluorescent lamp 26, the feeding to the lighting circuit 28 is stopped, the oscillation of the lighting circuit 28 is stopped, or the amount of the feeding to the lighting circuit 28 is reduced.

According to the film image scanning apparatus of the second embodiment, there can be omitted the CCD sub-scanning motor 24 for scanning the line sensor 22, which is needed in the first embodiment, and the driving system can be omitted.

In the above-mentioned first and second embodiments, in reproducing magnetic data recorded in the magnetic recording layer 30b of the film 30, the feeding to the light source drive circuit such as an inverter circuit, serving as a noise source, is prohibited, or the amount of the feeding is reduced. Thereby, in reproducing magnetic data, the S/N ratio can be reduced, and the generation of the error can be reduced.

In the above-mentioned embodiments, the fluorescent lamp 26 was used as a light source. However, the present invention is not limited to the fluorescent lamp 26. There may be used a light emitting diode (LED), a halogen lamp, and a xenon tube.

Particularly, in a case where the light emitting control using LED is executed by the pulse drive or three LEDs corresponding to three colors (R, G, B) are changed at high speed, these light source driving circuits may become the noise source when magnetic data is reproduced. Due to this, the above-mentioned methods are useful.

Moreover, in the above-mentioned embodiments, both the fluorescent lamp 26, serving as the light source, and the line sensor 22 or the area sensor 40 are turned off in reproducing magnetic data. However, only the fluorescent lamp 26 is turned off, or only the line sensor 22 or only the area sensor 40 may be turned off, depending on degree of the generation of the error occurred in reproducing magnetic data.

Furthermore, in the above-mentioned embodiment, the feeding to the fluorescent lamp 26, serving as the light source, was prohibited in reproducing magnetic data. However, only the amount of the feeding to the light source drive circuits may be reduced, depending on degree of the generation of the error occurred in reproducing magnetic data. In other words, the amount of the feeding to the light source drive circuits is reduced in step S102a of the flow chart of FIG. 4B, and the amount of the feeding to the light source drive circuits is returned to the original in step S107a.

The steps of FIG. 4B other than the steps S102a and 107a are the same as the flow chart of FIGS. 4A and 4B.

Thereby, there can be reduced time till the fluorescent lamp 26 is in the stationary state in inputting the image.

In the above-mentioned embodiments, the image input of the corresponding frame was executed after magnetic data corresponding to one frame of the film 30 was reproduced. However, the present invention is not limited to the above order. It is possible to reproduce magnetic data of the corresponding frame after the image input corresponding to one frame of the film 30 is executed.

Moreover, the image input may be executed after magnetic data of all frame 30 or that of an arbitrary frame is reproduced. Conversely, magnetic data may be reproduced after the image input of all frame 30 or that of an arbitrary frame is executed.

In the above-mentioned embodiments, influence of noise, which is caused by the film drive motor 16, is extremely small to the extent that such noise can be substantially ignored, as compared with influence, which is caused by the CCD sub-scanning motor 24 and the light source drive circuits.

According to the above-mentioned embodiments of the present invention, the following structure can be obtained.

(1) A film image scanning apparatus comprising a reproduction device for reproducing magnetic data recorded in a film; a light source for illuminating the film; a light source drive circuit for driving the light source; and power feeding control means for prohibiting a power feeding to the light source drive circuit or reducing an amount of power feeding in reproducing magnetic data.

(2) The film image scanning apparatus according to the above item (1) wherein the power feeding control means is a CPU (central processing unit).

(3) A film image scanning apparatus comprising film drive means for winding and rewinding a film; a light source for illuminating the film; and a light source drive circuit for driving the light source, wherein the film scanning apparatus prohibits power feeding to the light source drive circuit or reduces an amount of power feeding when the film is wound or rewound.

(4) A film image scanning apparatus comprising a reproduction device for reproducing magnetic data recorded in a film; a light source for illuminating the film; and a light source drive circuit for driving the light source in advance to prohibit a power feeding to the light source or reduce an amount of feeding only when magnetic data is reproduced.

According to the above-structured film image scanning apparatus, since luminance can be returned to a stationary state immediately after the light source is turned on again, luminance of the light source can be stabilized and no trouble occurs in reading an image.

(5) A film image scanning apparatus comprising a reproduction device, having a magnetic reproduction head and a magnetic reproduction circuit, for reproducing magnetic data recorded in a film; a light source for illuminating the film; a light source drive circuit for driving the light source; an image sensor, serving as a line sensor or an area sensor, for converting image data of the film to an electrical signal; a film drive means for winding and rewinding the film; and power feeding control means for prohibiting a power feeding to the light source drive circuit or reducing an amount of power feeding in reproducing magnetic data.

(6) A film image scanning apparatus comprising a reproduction device, having a magnetic reproduction head and a magnetic reproduction circuit, for reproducing magnetic data recorded in a film; a light source for illuminating the film; a light source drive circuit for driving the light source; an image sensor, serving as a line sensor, for converting image data of the film to an electrical signal; image sensor drive means for scanning the line sensor in an advancing direction of the film; film drive means for winding and rewinding the film; and power feeding control means for prohibiting a power feeding to the image sensor, the image sensor drive means and the light source drive circuit or reducing an amount of feeding in reproducing magnetic data.

(7) A film image scanning apparatus according to the above item (6), wherein the light source is a fluorescent lamp, and the light source drive circuit is an inverter circuit light source drive circuit.

According to the film image scanning apparatus, noise generated from the inverter circuit light source drive circuit can be eliminated in reproducing magnetic data.

(8) A film image scanning apparatus comprising a reproduction device for reproducing magnetic data recorded in a film; a light source for illuminating the film; and a light source lighting circuit for prohibiting a power feeding to the light source or reducing an amount of power feeding in reproducing magnetic data.

(9) A film image scanning apparatus according to the above item (8), wherein the light source lighting circuit includes an inverter circuit.

(10) A film image scanning apparatus comprising a reproduction device for reproducing magnetic data recorded in a film; and a fed noise generation source wherein a power feeding to the noise generation source is prohibited or an amount of power feeding is reduced when the magnetic data is reproduced.

As mentioned above, according to the present invention, there can be provided a film image scanning apparatus in which an S/N ratio of reproduced magnetic data can be prevented from being deteriorated by noise generated from a peripheral circuit when magnetic data is reproduced from a magnetic recording layer of a developed silver salt photographing film having magnetic data recorded, thereby a reproduction error can be prevented and magnetic data can be correctly read in the case of using the silver salt photographing film having the magnetically recordable magnetic recording portion.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A film image scanning apparatus comprising:
- a light source for illuminating a developed silver salt photographing film having a magnetic recording portion on which magnetic data is recorded;
- light source drive means for driving said light source;
- image read means for reading image data from said film illuminated by said light source;
- reproduction means for reproducing the magnetic data recorded on the magnetic recording portion of said film; and
- power feeding control means for prohibiting a power feeding to said light source drive means or reducing an amount of the power feeding when the magnetic data is reproduced by said reproduction means.

2. The apparatus according to claim 1, wherein said light source comprises a fluorescent lamp.

3. The apparatus according to claim 1, wherein said light source drive means includes an inverter circuit.

4. The apparatus according to claim 1, wherein said power feeding control means controls said light source drive means such that said light source is driven in advance to prohibit the drive of said light source or reduce the amount of the power feeding only when the magnetic data is reproduced.

5. The apparatus according to claim 1, wherein said feeding control means comprises a CPU (Central Processing Unit).

6. A film image scanning apparatus comprising:
a light source for illuminating a developed silver salt photographing film having a magnetic recording portion on which magnetic data is recorded;
light source drive means for driving said light source;
image read means for reading image data from said film illuminated by said light source;
reproduction means for reproducing the magnetic data recorded in the magnetic recording layer of said film; and
film drive means for winding and rewinding said film; and
power feeding control means for prohibiting a power feeding to said light source drive means or reducing an amount of the power feeding in winding and rewinding said film by said film drive means.

7. A film image scanning apparatus comprising:
a reproduction device, having a magnetic reproduction head and a magnetic reproduction circuit, for reproducing magnetic data recorded on a developed silver salt photographing film having a magnetic recording layer;
a light source for illuminating said film;
a light source drive circuit for driving said light source;
an image sensor for converting image data of said film to an electrical signal;
image sensor drive means for scanning said line sensor in a feeding direction of said film;
film drive means for winding and rewinding said film; and
power feeding control means for prohibiting a power feeding to said image sensor, said image sensor drive means and the light source drive circuit or reducing an amount of power feeding when the magnetic data is reproduced by said reproduction device.

8. The apparatus according to claim 7, wherein said image sensor comprises a photographing device such as a line sensor or an area sensor.

9. A film image scanning apparatus comprising:
a light source for illuminating a developed silver salt photographing film having a magnetic recording portion on which magnetic data is recorded;
image read means for reading image data from said film illuminated by said light source;
reproduction means for reproducing the magnetic data recorded on the magnetic recording portion of said film; and
power control means for turning off said light source when the magnetic data is reproduced by said reproduction means.

10. The apparatus according to claim 9, wherein said power control means turns on said light source in advance, and turns off said light source when the magnetic data is reproduced by said reproduction means.

11. A film image scanning apparatus comprising:
a light source for illuminating a developed silver salt photographing film having a magnetic recording portion on which magnetic data is recorded;
image read means for reading image data from said developed film when said developed film is illuminated by said light source;
film drive means for winding and rewinding said film;
reproduction means for reproducing the magnetic data recorded on the magnetic recording portion of said film while said film is being driven by said film drive means; and
power control means for turning off said light source during winding and rewinding of said film by said film drive means so as to prevent deterioration of the reproduced magnetic data due to noise generated by said light source.

12. A film image scanning apparatus comprising:
illumination means for illuminating a developed silver salt photographing film having a magnetic recording portion on which magnetic data is recorded;
illumination drive means for driving said illumination means;
image read means for reading a photographing image formed on said film;
magnetic read means for reading the magnetic data recorded on said magnetic recording portion of said film; and
control means for controlling said illumination drive means in accordance with a state of said magnetic read means.

13. The apparatus according to claim 12, wherein said illumination drive means has an inverter circuit.

14. The apparatus according to claim 13, wherein said control means reduces an oscillation frequency of said inverter circuit of said illumination drive means.

15. The apparatus according to claim 13, wherein said control means stops the inverter circuit of said illumination drive means.

16. The apparatus according to claim 12, wherein said control means reduces an amount of feeding of said illumination drive means.

17. The apparatus according to claim 12, wherein said control means stops the feeding of said illumination drive means.

18. The apparatus according to claim 12, wherein said magnetic read means reads magnetic data after said control means controls said illumination drive means to have a small amount of noise.

19. The apparatus according to claim 12, wherein said power control means controls said illumination means to be turned on after said magnetic read means reads magnetic data.

20. A film image scanning apparatus comprising:
illumination means for illuminating a developed silver salt photographing film having a magnetic recording portion on which magnetic data is recorded;
illumination drive means for driving said illumination means;
image read means for reading a photographing image formed on said film;
magnetic read means for reading the magnetic data recorded on said magnetic recording portion of said film; and
control means for controlling said illumination drive means and said image read means in accordance with a state of said magnetic read means.

21. The apparatus according to claim 20, wherein said image read means comprises a one or two-dimensional photographing device.

22. The apparatus according to claim 20, wherein said drive means stops the drive of said image read means.

23. The apparatus according to claim 20, wherein said image read means reads the image after said magnetic read means reads magnetic data and said control means controls said illumination means to be turned on, and after a predetermined time has passed.

24. A film image scanning apparatus comprising:

illumination means for illuminating a developed silver salt photographing film having a magnetic recording portion on which magnetic data is recorded;

illumination drive means for driving said illumination means;

image read means for reading a photographing image formed on said film;

magnetic read means for reading the magnetic data recorded on said magnetic recording portion of said film; and control means for controlling at least an amount of power feeding to said illumination drive means to be stopped or reduced or a drive frequency to be reduced or stopped when said magnetic read means reads magnetic data.

25. The apparatus according to claim 24, wherein said magnetic read means reads the magnetic data recorded on said magnetic portion of said film by means of a magnetic head positioned at an opposite side of said illumination means through said film.

* * * * *